(12) United States Patent
Sauer

(10) Patent No.: US 7,942,163 B2
(45) Date of Patent: May 17, 2011

(54) FLAT FACE, PIPE COUPLING WITH SPRING-LOADED SHUTOFF SLEEVES TO PREVENT SPILLAGE UPON UNCOUPLING

(75) Inventor: Thomas Sauer, Dettingen/Erms (DE)

(73) Assignee: Faster S.p.A., Milan (IT)

( * ) Notice: Subject to any disclaimer, the term of this patent is extended or adjusted under 35 U.S.C. 154(b) by 308 days.

(21) Appl. No.: 12/154,406

(22) Filed: May 22, 2008

(65) Prior Publication Data

US 2009/0289453 A1 Nov. 26, 2009

(30) Foreign Application Priority Data

May 24, 2007 (DE) .......................... 10 2007 025 787

(51) Int. Cl.
*F16L 37/28* (2006.01)
(52) U.S. Cl. ............................ 137/614.06; 137/614.03
(58) Field of Classification Search .................. 137/614, 137/614.03–614.06, 242, 243–243.2; 251/149.1, 251/149.6
See application file for complete search history.

(56) References Cited

U.S. PATENT DOCUMENTS

| | | | | |
|---|---|---|---|---|
| 1,869,411 | A * | 8/1932 | De Mooy | 137/614 |
| 3,123,099 | A * | 3/1964 | Breuning et al. | 137/614.06 |
| 3,367,366 | A * | 2/1968 | Oliveau et al. | 137/614.05 |
| 4,222,411 | A * | 9/1980 | Herzan et al. | 137/614.04 |
| 4,819,692 | A * | 4/1989 | Olson et al. | 137/614.03 |
| 5,398,723 | A * | 3/1995 | Allread et al. | 137/614.03 |
| 6,035,894 | A * | 3/2000 | Weh et al. | 137/614.06 |
| 6,488,043 | B2 * | 12/2002 | Flick | 137/614 |
| 6,675,833 | B2 * | 1/2004 | Maldavs | 137/614.05 |
| 6,866,064 | B2 * | 3/2005 | Nanni et al. | 137/614.03 |
| 7,762,279 | B2 * | 7/2010 | Zeiber et al. | 137/614.05 |

\* cited by examiner

*Primary Examiner* — Kevin L Lee

(74) *Attorney, Agent, or Firm* — Kirschstein, et al.

(57) ABSTRACT

A pipe coupling connecting and disconnecting media conducting pipes, hoses or like conduits, which comprise two coupling halves situated at ends of the conduits; and a connector and a socket end having shutoff sleeves in both coupling halves.

13 Claims, 5 Drawing Sheets

FLAT FACE, PIPE COUPLING WITH SPRING-LOADED SHUTOFF SLEEVES TO PREVENT SPILLAGE UPON UNCOUPLING

BACKGROUND OF THE INVENTION

The invention relates to a pipe coupling, comprising coupling halves which are situated at pipe ends, namely a connector and a socket end.

In order to connect and disconnect media conducting pipes, hoses or the like, nowadays flat sealing couplings with a low amount of leakage oil, also called flat face couplings, are increasingly used which comprise two coupling halves which can be plugged into one another, a connector and a socket end. Flat face coupling halves are distinguished by in each case flat end sides which can be cleaned easily before a coupling operation; moreover, they have a low amount of leakage oil, since no oil has to be routed into the open during coupling or in the case of disconnecting.

Coupling halves can be pushed into one another and held manually or by means of apparatuses, such as by screw connections, plug connections having snap-action closures, eccentric drives, media-loaded cylinder/piston units or the like.

When the pipe ends with their coupling halves which are situated on them are pushed into one another, the overall pipe length is disadvantageously shortened by the push-in distance, which entails a reduction in the original pipe volume and therefore requires a necessary compression of contained media.

If media which can be compressed only with difficulty or have already been pressurized are situated in the pipes, such as water or oil, the pipe coupling operation requires a very large amount of force. A pipe connection often cannot be produced because the available push-in force of the coupling apparatuses is not sufficient to provide the necessary force for media compression.

These coupling problems are often solved on construction site vehicles by an unpermitted discharge of excess oil from pipelines into the environment, which cannot be tolerated in fact.

Recently, there have been technical attempted solutions, such as a coupling connector which is described in DE-U 202006014061.1, which attempt to split the described overall, necessary pipe shortening during pipe connection into a first region which is as large as possible of an easily possible air compression and into a remaining region which is as small as possible of a fluid compression.

As has been shown in practice, although it is made easier to achieve the necessary media compression, it is still not sufficient for operation without problems. Specifically in the case of pipes having a large volume, this volume-split media compression cannot be achieved with conventional push-in apparatuses.

A further conventional attempted solution, likewise to be seen in DE-U 202006014061.1, comprises it being possible for media pressure to escape from the connector side into the socket end side by means of a small pressure relief valve which opens during the split compression travel, and for it to be possible for any differing media pressures to be thus reduced in an equalizing manner.

This aid also alleviates the problems during the connection of coupling halves only in a limited and very restricted manner.

SUMMARY OF THE INVENTION

It is therefore an object of the invention to propose a pipe coupling which seals flatly as best as possible and exhibits a low amount of leakage oil, which pipe coupling does not cause pipe shortening nor therefore media compression during the connection of coupling halves. The individual parts of the pipe coupling should be designed in such a way that easy operation and pressuretight and nondestructive operation is ensured even at a high pressure in one or in both pipes.

The object is achieved by the claims.

Accordingly, both coupling halves have sleeve-shaped shutoff elements which can be displaced into their possible end positions "open" and "closed" without media compression, or without significant media compression. If a sleeve-shaped shutoff element is pushed so as to extend telescopically from one coupling half into another coupling half which has previously been positioned opposite it, the other sleeve-shaped shutoff element is driven telescopically as a result, with the result that both shutoff sleeves are open after they have been connected by a first sleeve push-over movement in a pressuretight manner.

One coupling half comprises a connector which has a shutoff sleeve which can be pushed out telescopically. The shutoff sleeve has an inner widened sleeve portion which is closed on both sides in a pressuretight manner and can shut off lateral media outlets on the connector-side pipe end in a closed position. Movement means, such as of an eccentric drive, are provided for displacing and for holding said shutoff sleeve in the two desired positions, namely "open" or "closed".

The socket end likewise has a sleeve-shaped, spring-loaded slide as shutoff element which closes automatically when the pipe coupling is disconnected.

In order to connect the coupling halves, the connector and the socket end are positioned manually in a first work step with respect to one another in such a way that the flat end sides lie opposite one another without any significant intermediate space, and can no longer be removed from one another axially.

At the best, the holding means for manually positioning the coupling halves are positioned in such a way that, in the case of a movement, in which they hook into one another, the end faces of the coupling halves have to glance past one another and in the process clean themselves automatically of coarse dirt.

In a second work step, the connector-side shutoff sleeve is pushed from the position "closed" into the position "open" by means of movement means, and the shutoff sleeve moves positively in a telescopically extending manner into the socket end which was previously positioned in an axially aligned manner. Here, the connector-side shutoff sleeve moves with its front sealing face over the connector-side pipe end and is pushed sealingly over the socket end-side shutoff sleeve as far as a stop, and, in its further push-in travel, drives the socket end-side shutoff sleeve which bears against said stop positively from the closed position into the open position.

The pipe coupling is thus connected. According to the invention, no pipe shortening took place. The pipe volume has remained constant and there was therefore no media compression induced by coupling. The coupling operation can be brought about with a small amount of force, irrespectively of media states.

Securing means are provided which prevent accidental actuation of the connector-side shutoff sleeve.

Although the described pipe coupling does not cause any media compression during the coupling operation, a small desired media compression can be achieved by the connector-side and/or socket end-side shutoff sleeves having two sealing faces of slightly different size, and therefore forming a media displacement space having a small volume. It is sufficient if the sealing ring diameters differ, for example, only by tenths of a millimeter. The resulting pressure medium loading can be used for targeted additional shutoff sleeve loading in the closing direction, which does not do any damage, however, to the actual object of constant pipe volume during pipe coupling.

The coupling halves of the described pipe coupling can be arranged in each case in a stationary manner on machines or in a mobile manner on hoses on the attachment unit side.

DESCRIPTION OF THE DRAWINGS & DETAILED DESCRIPTION OF THE PREFERRED EMBODIMENTS

The invention will be explained using the drawings:

FIG. 1 shows: a perspectively illustrated pipe coupling (1), comprising two coupling halves, a connector (2) and a socket end (3), in the disconnected state.

The socket end (3) has a socket end housing (20) with an end-side flange (5) which is rectangular here and can be used as a hook, and with a rear-side pipe connection (22) with a flats width (SW) for fastening a hose line on the attachment unit side.

The connector (2) is welded to a connector housing (10) in a stationary manner on a machine (4) and has a rear-side pipe connection (17), with a flats width (SW) for fastening pipes or hoses or the like which lead away, and an end-side hook rail (6) which is suitable for receiving the mobile socket end (3) on the flange (5).

In the end-side intermediate region of the hook rail (6), the flatly positioned shutoff sleeve (12) and the centrally fixed pipe end (17) can be seen.

The movement and actuating means for the shutoff sleeve (12) are installed on one side of the connector housing (10). An eccentric wheel (9) can be rotated within its stops (8) into two end positions by means of a pluggable lever (7). The eccentric wheel (9) has its eccentric (36) acting in the connector housing (10). The eccentric wheel (9) is screw mounted here.

The manual positioning (MP) of the mobile socket end part (3) in the stationary connector housing (1) can be understood using the arrow; here, the machine part (4) can form a lower stop in the hook rail (6).

In order to actuate the connector-side shutoff sleeve (12), the pluggable lever (7) is fastened by way of a securing cable (41) to the mobile socket end (3); the pipe coupling can therefore be actuated only when the socket end and the connector are together.

Accidental opening of the connector is prevented as a result.

Irrespectively of this drawing, the connector (2) can also be configured as a mobile coupling half, just as the socket end (3) can be assigned to a machine (4) in a stationary manner. Holding means, such as a hook (5) and a hook rail (6), can also be arranged as desired on the connector or the socket end.

FIG. 2 shows: a pipe coupling (1) illustrated in section in plan view, wherein the connector (2) and the socket end (3) are hooked with one another by means of a hook rail (6) and a hook flange (5) in such a way that the coupling halves cannot be removed from one another axially.

Both coupling halves have sleeve-shaped shutoff elements which are closed in a pressuretight manner, wherein the socket end-side shutoff sleeve (23) is closed automatically in a spring-loaded manner (33), and the connector-side shutoff sleeve (12) is held on a recess (34) by eccentrics (36). By a rotation of the eccentric wheel (9) in the thread (35), the eccentric (36) can move said connector-side shutoff sleeve (12) into its end position and hold it there; here, buffers (16) can produce additional clamping force.

The connector (2) has a connector housing (10) which is connected fixedly to the pipe connection and the pipe end (17). Lateral media outlets (18) which are closed here in a pressuretight manner by the shutoff sleeve (12) by means of sealing rings (13) and by the sealing ring (14) are situated at the pipe end (17).

The diameters of the sealing rings (13 and 14) are advantageously equally large, with the result that intentional displacement of the shutoff sleeve (12) is possible without media compression.

According to the invention, the sealing ring (14) can also be slightly larger than the sealing ring (13), in order to obtain slight additional shutoff sleeve loading in the closing direction. This difference in the sealing ring diameter can also comprise only tenths of a millimeter and does not stop the originally intended diameter parity.

The eccentric wheel (9) is situated in its right-hand stop, and therefore in a closed position of the shutoff sleeve (12).

The connector housing (10) has four holes (11) for possible screw fastening to a machine part (4).

The socket end (3) has a socket end housing (20) which is connected fixedly to the pipe connection and the pipe end (22). The pipe end has lateral media outlets (26, 30) and an extended shaft (29) with a conical shaft end (28), the lateral media outlets (26 and 30) being closed in a pressuretight manner by the shutoff sleeve (23) with its terminating sealing rings (24 and 25). In the front region of the conical shaft end (28), the medium which is situated there (27) is closed against the end-side end of the shutoff sleeve (23), best of all metallically. Only pressureless medium is situated in this media space of the widened sleeve portion (27) and the tapered shaft (29), since the actual pipe shutoff takes place in the region of the lateral media outlets (26).

The sealing rings (24 and 25) have an identically large or approximately identically large diameter, in order that no media compression is caused during an intended displacement of the shutoff sleeve (23).

However, the sealing ring (25) can also be slightly larger than the sealing ring (24); additional loading, which is dependent on the pressure medium, of the spring-loaded (33) shutoff sleeve (23) in the closing direction is therefore ensured. This difference in the sealing ring diameter can also comprise only tenths of a millimeter and does not damage the originally intended diameter parity.

A spring-loaded (32) dirt protection sleeve (21) which ends flatly on the end side (40) of the socket end (3) is also situated between the socket end housing (20) and the shutoff sleeve (23). Counter to its spring loading (32), the dirt protection sleeve (21) has a first possible free insertion travel until it comes into contact with a stop on the shutoff sleeve (23), and then has a further possible insertion travel as far as its end position by also driving the shutoff sleeve (23) which bears against the stop counter to its loading (33).

The flange (5) of the socket end (3) can be of round or angular design for insertion into a hook rail (6).

FIG. 3 shows: the pipe coupling (1) of FIG. 2, but in a partially actuated connector-side shutoff sleeve movement (12).

To this end, the actuating lever (7) has been rotated by approximately 90°, wherein the eccentric (36) loaded the connector-side shutoff sleeve (12) in the recess (34), and therefore a translatory outward thrust movement of the shutoff sleeve (12) has been brought about from a rotational movement of the eccentric.

Since the two coupling halves (2 and 3) have previously been positioned manually with their ends toward one another, the extending shutoff sleeve (12) has moved directly into the axially aligned end side (40) of the socket end (3) and in the process has pushed back the dirt protection sleeve (21) as far as a stop on the socket end-side shutoff sleeve (23). At the same time, the connector-side shutoff sleeve (12) has been pushed over the socket end-side shutoff sleeve (23) and makes a pressuretight sleeve connection possible by way of at least one sealing ring (13).

The application of force for actuating the lever (7) is low, since no significant pressure medium loading can counteract it.

FIG. 4 shows: the pipe coupling (1) of FIG. 2 and FIG. 3, but with a completely actuated shutoff sleeve movement and therefore in the intended pipe connection which is open for media (42).

To this end, the actuating lever (7) has been rotated by approximately a further 90° to a further possible stop (8), as a result of which the eccentric (36) has conveyed the connector-side shutoff sleeve (12) out into its extended end position, this further extending movement signifying a simultaneous further insertion movement into the socket end (3) which cannot remove itself axially. As a result, the connector-side shutoff sleeve (12) has pushed back the socket end-side dirt protection sleeve (21) together with the socket end-side shutoff sleeve (23) which bears against the stop, counter to their spring loading (32, 33).

The shutoff sleeves (12 and 23) which are sealed off with respect to one another ensure an open media throughflow channel (42) via their inner widened sleeve portions (15 and 27) between the lateral media outlets (18 and 26) of the two pipe ends (17 and 22).

A small media outlet (30) corresponds with the intermediate space of the sealing rings (24 and 25) and can thus load slightly present sealing ring sizes (24, 25) in such a way that, in addition to the spring loading, a closure of the shutoff sleeve (23) which is possibly desired in a sudden manner also affords pressure-dependent media loading.

The application of force for actuating the lever (7) is also low here, since no significant pressure medium loading can prevail. The application of force for holding the pipe connection is also low, since the forces of the pipes which attempt to move apart are held axially by the hook (5) and the hook rail (6).

Figure 1:
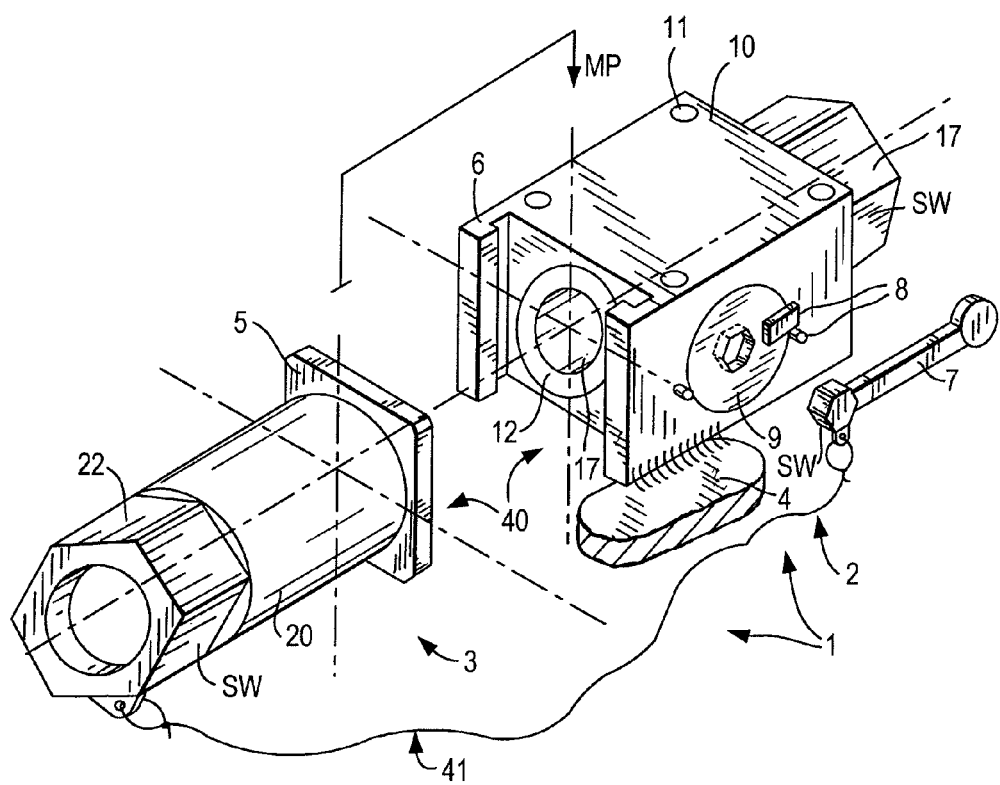
Figure 2:
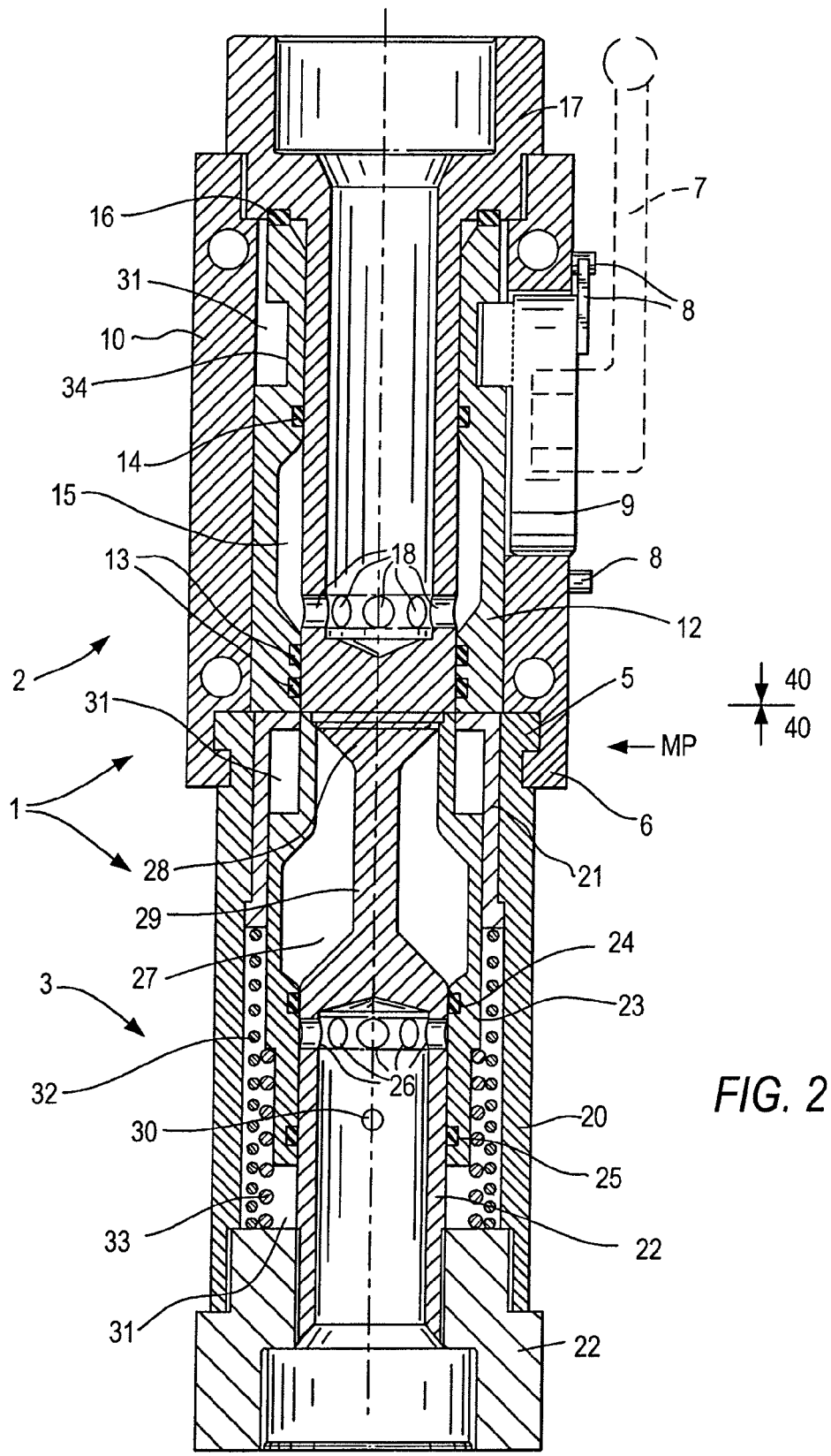
FIGS. 2 to 4 show the production of a pipe connection in three steps. The disconnection of the pipe coupling (1) is to be performed in the reverse order.
Figure 3:
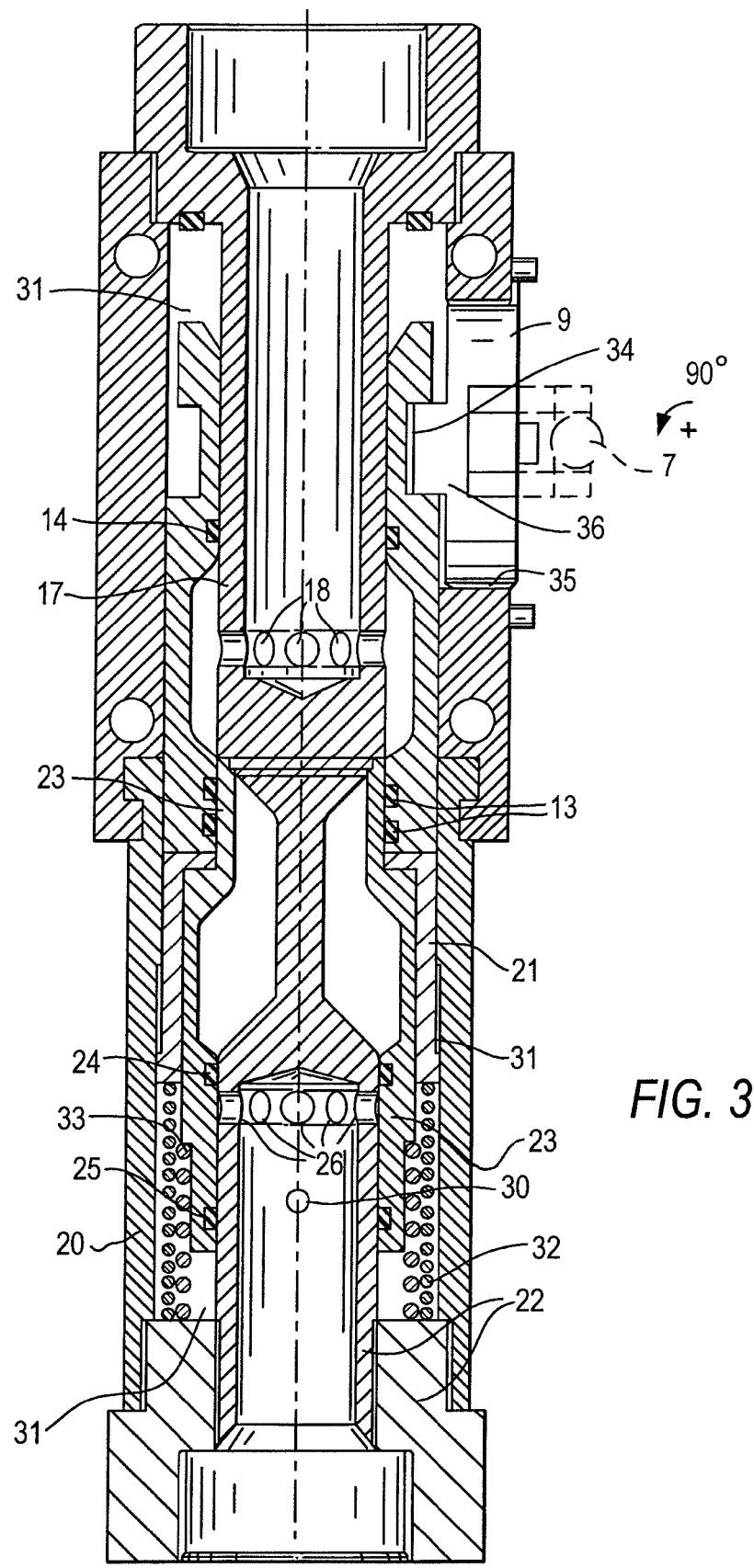
Figure 4:
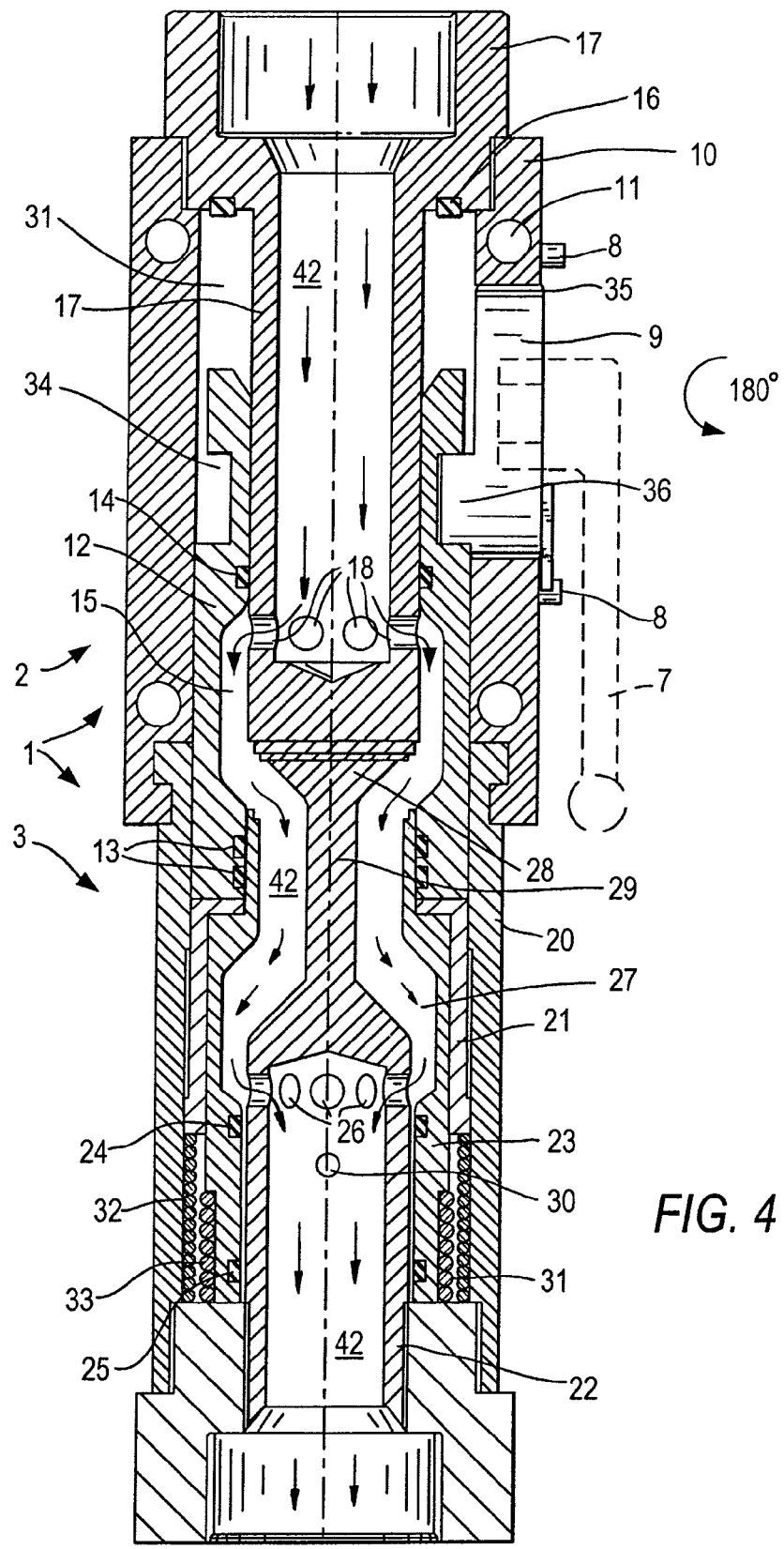
Figure 5:
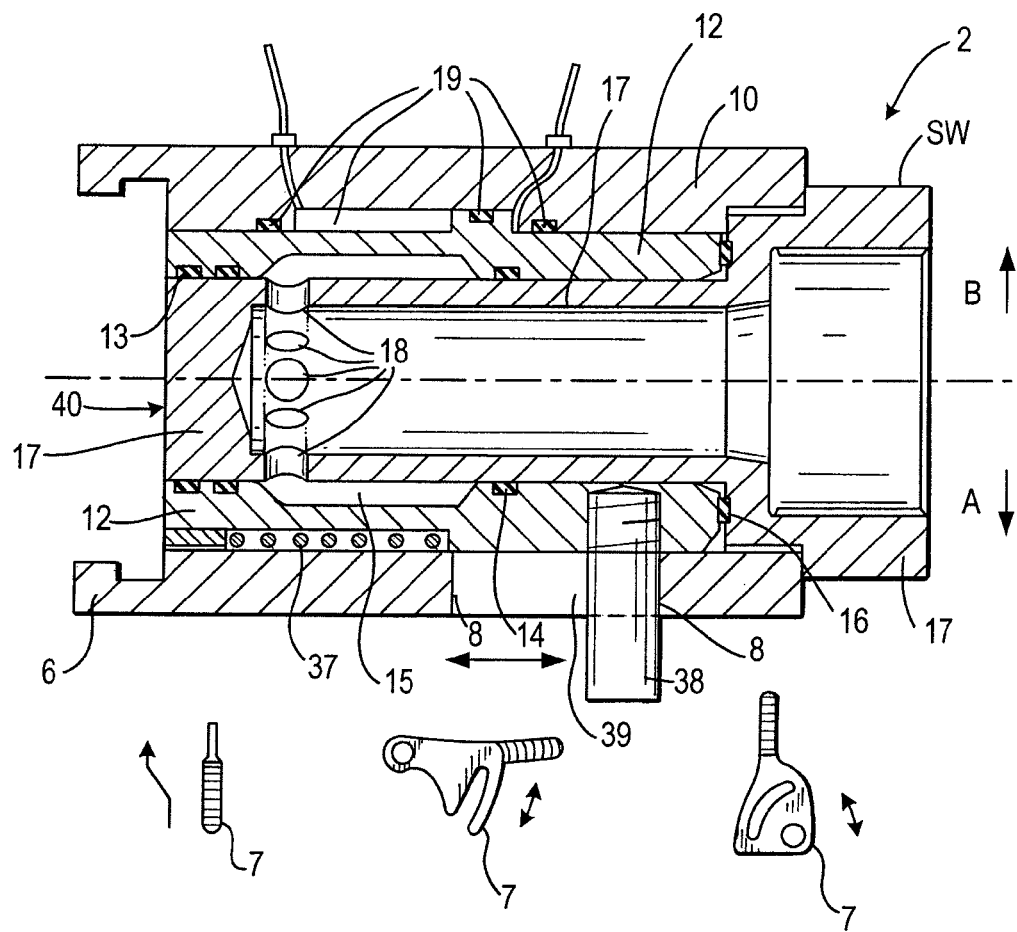
FIG. 5 shows: a coupling half of a pipe connection (1), namely a connector (2) illustrated in section, in plan view, the illustrated halves (A and B) having different movement and holding means of the shutoff sleeve (12).

The half (A) shows a cylinder/piston unit (19) which is operated by pressure medium, with corresponding supply lines.

The half (B) shows a spring-loaded and manually movable shutoff sleeve (12). At best, the manual movability of the shutoff sleeve (12) is achieved by axially aligned transverse pins (38) protruding out of the connector housing (10) and being displaced by means of levers in the manner of cam disks.

If only one transverse pin (38) protrudes out of the connector housing (10), the procedure can be carried out by means of a lever (7) in a groove (39) with corresponding switching positions.

REFERENCE NUMERALS

1 Pipe coupling
2 Connector
3 Socket end
4 Machine
5 Hook, flange
6 Hook rail
7 Actuating lever
8 Stop
9 Eccentric wheel
10 Connector housing
11 Holes
12 Shutoff element, shutoff sleeve, connector-side
13 Sealing ring, end-side
14 Sealing ring, rear
15 Inner widened sleeve portion
16 Buffer
17 Pipe, pipe connection, connector-side
18 Lateral holes, media outlets
19 Cylinder/piston unit
20 Socket end housing
21 Dirt protection sleeve
22 Pipe, pipe connection, socket end-side
23 Shutoff element, shutoff sleeve, socket end-side
24 Sealing ring, end-side
25 Sealing ring, rear
26 Lateral holes, media outlets
27 Inner widened sleeve portion
28 Conical shaft end
29 Shaft
30 Transverse hole, media outlet
31 Atmospheric empty space
32 Spring
33 Spring
34 Recess
35 Thread
36 Eccentric
37 Spring
38 Transverse pin
39 Groove, guide
40 End side
41 Securing cable
42 Open media channel
MP Manual positioning
SW Flats width

The invention claimed is:

1. A pipe coupling for pressurized media, comprising:
a first coupler having a first housing, a first conduit extending along a longitudinal axis, and a first shutoff sleeve surrounding the first conduit and movable along the longitudinal axis between a closed state and an open state, the first shutoff sleeve bounding a first annular compartment with the first conduit within the first housing in the closed state, the first conduit having a flat first end face at a first inner axial end region, a first interior passage, and a plurality of first ports that extend between the first interior passage and the first annular compartment, the first shutoff sleeve containing the pressurized media in the first annular compartment in the closed state;
a second coupler having a second housing, a second conduit extending along the longitudinal axis, and a second shutoff sleeve surrounding the second conduit and movable along the longitudinal axis between a closed position and an open position, the second conduit having a shaft that terminates in a flat second end face at a second inner axial end region, a second interior passage, and a plurality of second ports in communication with the second interior passage, the second shutoff sleeve bounding a second annular compartment with the shaft within the second housing, the second shutoff sleeve overlying the second ports in the closed position for containing the pressurized media in the second interior passage;

holders on the first and second housings for holding the first and second couplers together against movement apart along the longitudinal axis with the flat first and second end faces in mutual engagement in a held condition; and an actuator operative in the held condition of the first and second couplers for moving the first shutoff sleeve along the longitudinal axis to the open state in which the pressurized media is no longer contained in the first annular compartment and, in turn, for moving the second shutoff sleeve to the open position in which the second shutoff sleeve is remote from the second ports, thereby enabling the pressurized media to flow between the first and second couplers.

2. The pipe coupling as claimed in claim 1, wherein the first coupler has a plurality of first annular gaskets spaced apart along the longitudinal axis at opposite sides of the first annular compartment.

3. The pipe coupling as claimed in claim 2, wherein the second coupler has a plurality of second annular gaskets spaced apart along the longitudinal axis at opposite sides of the second ports.

4. The pipe coupling as claimed in claim 3, wherein the first and second annular gaskets have the same diameters.

5. The pipe coupling as claimed in claim 1, wherein the second coupler has a spring for constantly biasing the second shutoff sleeve to the closed position.

6. The pipe coupling as claimed in claim 1, wherein one of the couplers has a rail, and wherein the other of the couplers has a flange that is slid transversely of the longitudinal axis into the rail.

7. The pipe coupling as claimed in claim 1, wherein one of the couplers is fixed to a support, and wherein the other of the couplers is movable relative to the support.

8. The pipe coupling as claimed in claim 1, wherein the second coupler has a dirt protection cap mounted on the second shutoff sleeve for movement from an extended position to a retracted position along the longitudinal axis by movement of the first shutoff sleeve.

9. The pipe coupling as claimed in claim 8, wherein the second coupler has a spring for constantly biasing the dirt protection cap to the extended position.

10. The pipe coupling as claimed in claim 1, wherein at least one of the shutoff sleeves is spring-loaded to automatically contain the pressurized media therein when the first and second couplers are not in the held condition.

11. The pipe coupling as claimed in claim 1, wherein the flat first and second end faces have substantially the same diameters.

12. The pipe coupling as claimed in claim 1, wherein the actuator is manually actuated.

13. The pipe coupling as claimed in claim 1, wherein the actuator is actuated by a pressure source.

* * * * *